United States Patent [19]
Aoshima

[11] Patent Number: 5,136,318
[45] Date of Patent: Aug. 4, 1992

[54] CAMERA USING FILM HAVING MAGNETIC STORAGE PART

[75] Inventor: Chikara Aoshima, Kanagawa, Japan

[73] Assignee: Canon Kabushiki Kaisha, Tokyo, Japan

[21] Appl. No.: 798,047

[22] Filed: Nov. 27, 1991

Related U.S. Application Data

[63] Continuation of Ser. No. 634,102, Dec. 26, 1990, abandoned.

[30] Foreign Application Priority Data

| Dec. 28, 1989 | [JP] | Japan | 1-344801 |
| Mar. 23, 1990 | [JP] | Japan | 2-072111 |
| Jul. 27, 1990 | [JP] | Japan | 2-200575 |
| Sep. 4, 1990 | [JP] | Japan | 2-232521 |

[51] Int. Cl.$^5$ .................. G03B 17/00; G03B 17/24
[52] U.S. Cl. ........................... 354/105; 354/203
[58] Field of Search .................. 354/105, 106, 203

[56] References Cited

U.S. PATENT DOCUMENTS 4,972,213 11/1990 Stoneham et al. ............... 354/21

Primary Examiner—Michael L. Gellner
Attorney, Agent, or Firm—Fitzpatrick, Cella, Harper & Scinto

[57] ABSTRACT

A camera of the kind using a film which has a magnetic storage part comprises a magnetic head which is arranged to read and write information out of and into the magnetic storage part of the film; and a follow-up part which is arranged to follow up a yawing movement of the film resulting from the travel of the film without allowing the magnetic head to follow the movement of the film in its traveling direction.

65 Claims, 16 Drawing Sheets

CAMERA USING FILM HAVING MAGNETIC STORAGE PART

This application is a continuation of application Ser. No. 07/634,102, filed Dec. 26, 1990, now abandoned.

BACKGROUND OF THE INVENTION

1. Field of the Invention

This invention relates to a camera using a film which is provided with a magnetic storage part thereon.

2. Description of the Related Art

A camera which uses such a film that is provided with a magnetic storage part has recently been proposed, for example, in U.S. Pat. No. 4,864,332. This camera is arranged to record in the magnetic storage part some photographic information such as a shutter time value, an aperture value, a date, a title, etc. and to read out the recorded information as necessary by means of a magnetic head.

In the above-stated example of the prior art camera, the magnetic storage part of the film is disposed in a given position to extend in parallel with the lengthwise direction of the film. The magnetic head, therefore, must always be accurately positioned relative to this position particularly when the amount of information to be written in and read out increases. However, in feeding the film, the film yaws up and down relative to the picture plane while it is traveling. This has caused the following problems:

(1) The up and down yaw brings about a positional deviation between the magnetic head and the magnetic storage part of the film. Therefore, the photographic information cannot be accurately written in and read out.

(2) The magnetic gap of the magnetic head must be abutting on the magnetic storage part of the film as perpendicularly as possible to the latter. The above-stated yawing of the film, however, lowers the degree of perpendicularity of the magnetic gap of the magnetic head relative to the traveling direction of the film.

SUMMARY OF THE INVENTION

This invention is intended to solve the above-stated problems. It is, therefore, an object of the invention to provide a camera having a magnetic head arranged to read or write information out of or into the magnetic storage part of a film and follow-up means arranged to keep the magnetic head always in a position apposite to the storage part of the film by causing the magnetic head to follow the yawing movement of the film, without of following the film in the traveling direction thereof, when the film travels, so that the information can be accurately read out or written into the magnetic storage part of the film.

The above and other objects and features of the invention will become apparent from the following detailed description of embodiments thereof taken in conjunction with the accompanying drawings.

DETAILED DESCRIPTION OF THE PREFERRED EMBODIMENTS

Figure 1:
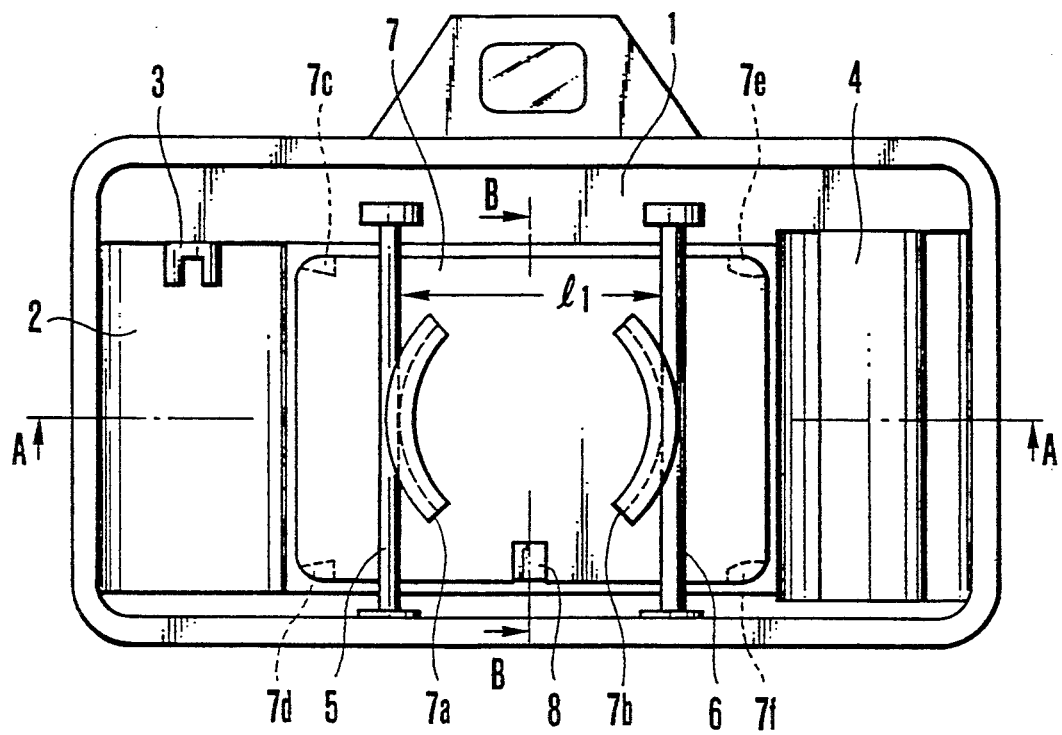
FIG. 1 is a rear elevation showing a camera arranged according to this invention with the back cover thereof omitted.
Figure 2:
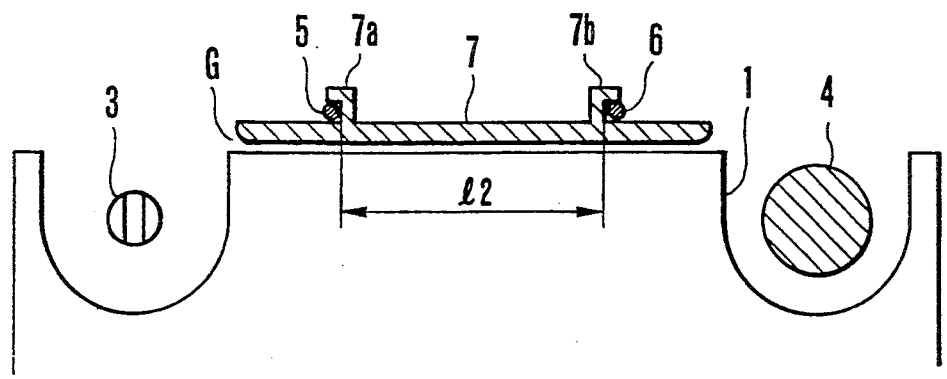
FIG. 2 is a sectional view taken on a line A—A of FIG. 1.
Figure 3:
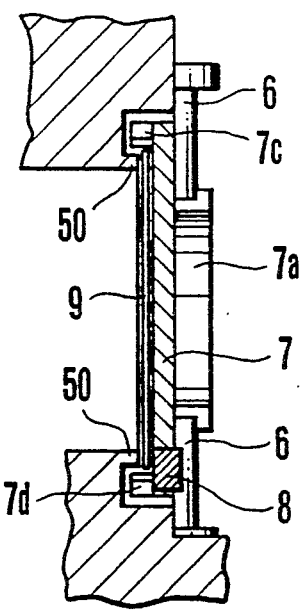
FIG. 3 is a sectional view taken on a line B—B of FIG. 1.
Figure 4:
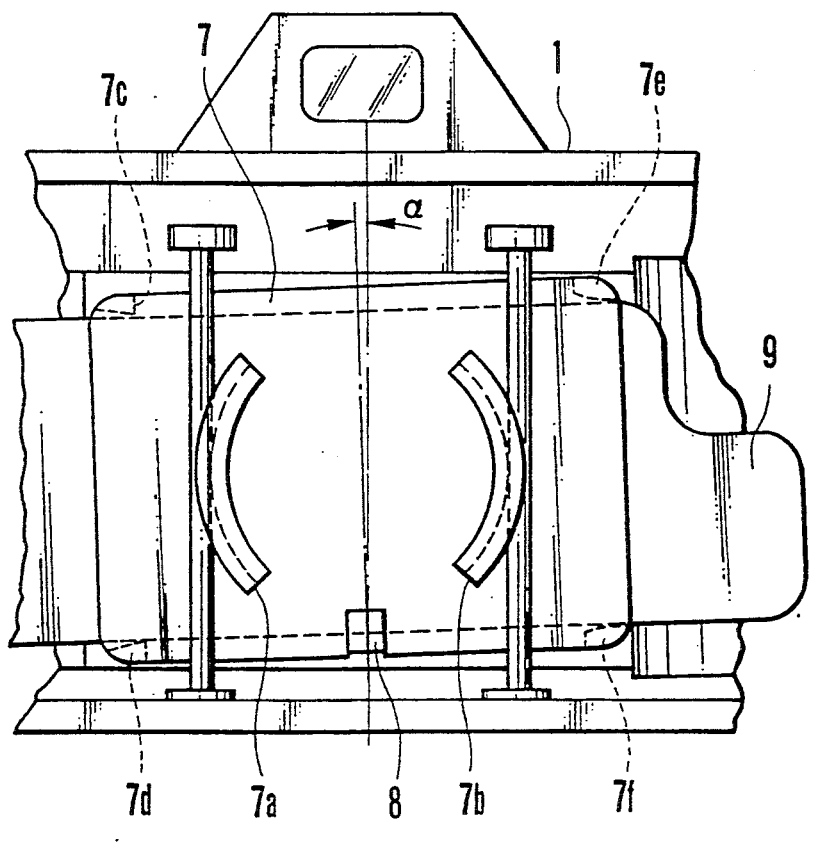
FIG. 4 is a rear elevation showing the position of a pressure plate of the camera of FIG. 1 in relation to a film.
Figure 5:
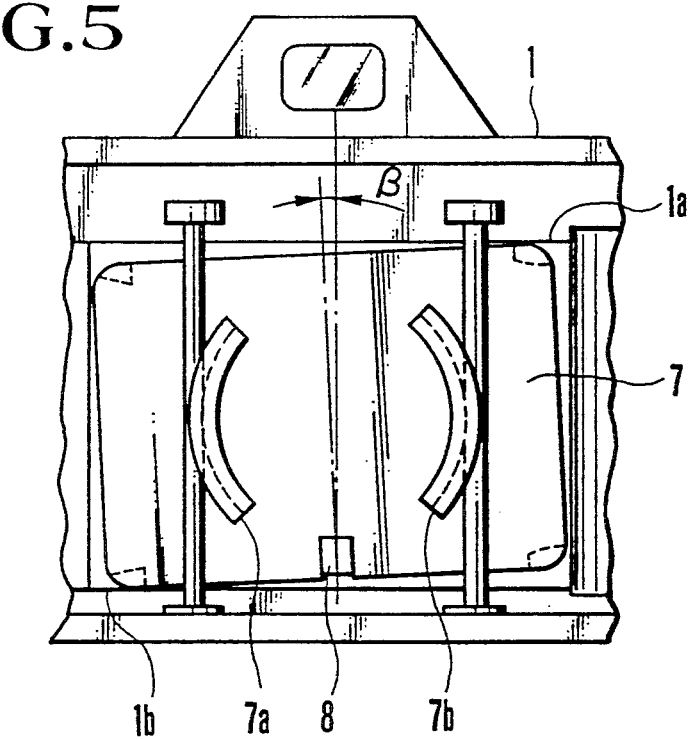
FIGS. 5 and 6 are rear elevations showing the position of the pressure plate under different operating conditions when the film is not loaded into the camera of FIG. 1.
Figure 6:
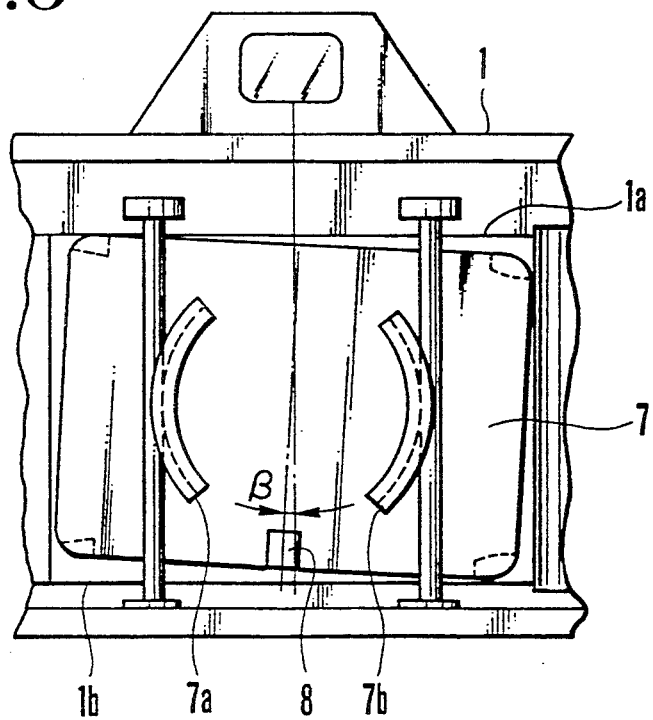

FIGS. 1 to 6 show a camera arranged according to this invention as an embodiment thereof. FIG. 1 shows it in a rear elevation with its back cover omitted. FIG. 2 is a sectional view taken along a line A—A of FIG. 1. FIG. 3 is a sectional view taken along another line B—B of FIG. 1. FIG. 4 is a rear elevation showing the position of a pressure plate of the same camera in relation to a film loaded into the camera. FIGS. 5 and 6 show the pressure plate under different operating conditions obtained when the camera is not loaded with the film.

Referring to FIG. 1, the illustration includes a camera body 1; a cartridge chamber 2 which is provided for stowing therein a film cartridge which is not shown; and a film feeding fork 3 which is arranged to engage the shaft of the film cartridge. A film spool 4 which is arranged to take up the film thereon is disposed on one side of the camera body opposite to the cartridge chamber 2 across an aperture which is not shown. Support shafts 5 and 6 which extend in parallel to each other are disposed perpendicularly to the traveling direction of the film. In the case of this embodiment, the support shafts 5 and 6 are formed in cylindrical shape having a circular section. Referring to FIG. 2, a pressure plate 7 which is employed as restricting means is arranged to determine the position of each exposure frame of the film in the direction of the optical axis of the camera and to ensure the flatness of the exposure frame. The pressure plate 7 is provided with a pair of locking parts 7a and 7b which are disposed on the upper surface of the plate 7 (on one side opposite to the film abutting side of the plate 7). Each of the locking parts 7a and 7b consists of a vertical part which is perpendicular to the pressure plate 7 and a horizontal part which rectangularly bends outward from the vertical part. Each of the locking parts 7a and 7b thus presents an L-like sectional shape and protrudes in the direction of the optical axis as a whole. Further, as shown in FIG. 1, the plan view of the locking parts 7a and 7b presents two opposed arcuate shapes which are symmetrical with respect to the center part of the pressure plate 7.

A distance 12 between the outermost side points of the vertical parts of the locking parts 7a and 7b is arranged to be substantially the same as a distance 11 between the innermost side points of the support shafts 5 and 6. The support shafts 5 and 6 are disposed within a recessed space defined jointly by the vertical and horizontal parts of the locking parts 7a and 7b and the pressure plate 7. This allows the pressure plate 7 to be slidable over the support shafts 5 and 6 in the vertical direction as viewed in FIG. 1 (in a direction orthogonally intersecting the traveling direction of the film). In addition to that, the pressure plate 7 is turnable approximately around the center thereof. However, the plate 7 never moves in the traveling direction of the film. Further, as shown in FIG. 2, the horizontal parts of the locking parts 7a and 7b are restricting the positions of the forward and backward positions of the pressure plate 7 in the direction of the optical axis by locking the support shafts 5 and 6 in an embracing manner.

The pressure plate 7 is provided further with guide parts 7c, 7d, 7e and 7f which are formed at four corners on the side of the film surface. Meanwhile, a magnetic head 8 is firmly buried in a lower position of the pressure plate 7, as shown in FIG. 3. The magnetic gap of the magnetic head 8 is arranged to face the magnetic storage part of the film and positioned to be perpendicular to the traveling direction of the film. A reference numeral 9 denotes the film which is shown in a state of being pulled out from a film cartridge which is not shown but is stowed in the above-stated cartridge chamber 2. The guide part 7c is paired with the guide part 7d while the guide part 7e is paired with the guide part 7f. The two edge parts of the film in the width direction of the film are in a state of being inserted in between these guide parts. In other words, the position of the film 9 is thus arranged to be unvarying relative to the pressure plate 7. On the surface of the film 9 on the side of the pressure plate 7 is formed a magnetic storage part, which is not shown. The magnetic storage part is arranged to have photographic information of varied kinds written in or read out therefrom by the magnetic head 8. Inner rails 50 are arranged to restrict the position of the film 9 in the direction of the optical axis as shown in FIG. 3.

When the film 9 is not positioned between the pair of guide parts 7c and 7d and between the other pair of guide parts 7e and 7f of the pressure plate 7, the pressure plate 7 is allowed to turn within a range until the upper and lower end parts of the pressure plate 7 come to abut on stoppers 1a and 1b of the camera body 1, as shown in FIGS. 5 and 6. The maximum inclination angle of the pressure plate 7 which is obtained under this condition is indicated by an angle $\beta$. Referring to FIG. 4, the angle of inclination of the pressure plate 7 caused by the yawing movement of the film 9 which takes place in feeding the film is assumed to be an angle $\alpha$. The above-stated angle $\beta$ is of course set at a value larger than the angle $\alpha$ caused by the yawing movement. All the guide parts 7c, 7d, 7e and 7f are provided with tapered faces, which are formed to be sloping to the cartridge chamber 2 to make spaces wider as shown in FIG. 4. The film 9 which is pulled out from the film cartridge chamber 2 is thus allowed to be smoothly fitted into these spaces between the guide parts 7c and 7d and between the guide parts 7e and 7f.

The embodiment arranged in the above-stated manner operates as follows: The back cover (not shown) which is pivotally attached to one side edge part of the camera body 1 is opened. A film cartridge is placed within the cartridge chamber 2. The cartridge to be used is of the kind completely stowing therein the whole strip of film including a film leader part while the film is not in use, as disclosed in U.S. Pat. No. 4,834,306. When the back cover is closed with the camera body having been loaded with the cartridge, the film is pulled out from the cartridge as the shaft of the cartridge begins to be rotated by the driving force of the film feeding fork 3. Next, when the film feeding fork 3 begins to be rotated clockwise by a motor which is not shown, the shaft of the cartridge (not shown) engaged with the fork 3 rotates in the same direction. The film 9 is moved out from the cartridge. Then, the leader part of the film comes into a gap G (FIG. 2) between the pressure plate 7 and the camera body 1. When the film 9 is moved to the right as viewed in FIG. 1, the positions of the two edge parts in the width direction of the film 9 are restricted first by the guide parts 7c and 7d of the pressure plate 7. When the film 9 further moves, the positions of the two edge parts in the width direction of the film 9 are restricted by the other pair of guide parts 7e and 7f. At a part between the two pairs of the guide parts, the film 9 passes by the position of the magnetic head 8. Therefore, the tip part of the magnetic head 8 comes into sliding contact with the magnetic storage part (not shown) of the film 9 for writing or reading photographic information into or out of the magnetic storage part. The leader part which is formed at the fore end of the film 9 is eventually wound around the film spool 4. After that, a film winding action is performed in a known manner solely by the rotation of the film spool 4 caused by a motor which is not shown.

Further, since the pressure plate 7 is arranged to be movable perpendicularly to the traveling direction of the film and also to be turnable on a plane which is parallel to the film surface, if the film 9 comes to yaw during the process of film feeding, the pressure plate 7 is capable of accurately following the yaw of the film. Then, since the magnetic head 8 is arranged in one unified body with the pressure plate 7, and since the two lateral edge parts of the film 9 are inserted in between the guide parts 7c, 7d, 7e and 7f of the pressure plate 7, the magnetic gap of the magnetic head 8 is always kept to be perpendicularly abutting on the magnetic storage part of the film 9.

Figure 7:
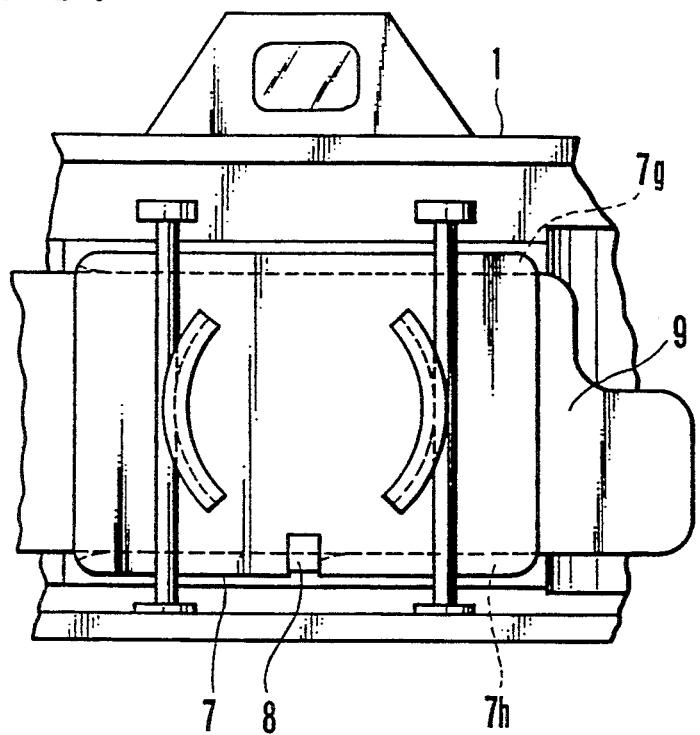
FIG. 7 is a rear elevation showing the position of the pressure plate of another embodiment of the invention in relation to a film.

FIG. 7 is a rear elevation of a camera arranged as another embodiment of the invention. The component parts of this embodiment (and those of other embodiments described hereinafter) that are the same as those of the first embodiment described above are indicated by the same reference numerals. Referring to FIG. 7, a pair of guide parts 7g and 7h are arranged at the upper and lower end parts of the obverse surface of the pressure plate 7 to come into sliding contact with the two lateral edge parts of the film. These guide parts 7g and 7h may be formed, for example, by stamping or drawing work on the pressure plate 7 into a rib-like shape or by attaching discrete members to the plate 7. To facilitate insertion of the film 9, tapered parts are formed at the left end parts of the upper and lower guide parts 7g and 7h in such a way as to give wider spaces on the side of the cartridge chamber 2. The arrangement of the second embodiment gives the same advantageous effect as the first embodiment shown in FIG. 1.

In each of the first and second embodiments shown in FIGS. 1 to 7, the pressure plate is provided with the guide parts for restricting the lateral edge positions of the film. Further, the pressure plate is arranged to be movable perpendicularly to the traveling direction of the film and to be turnable on a plane which is parallel to the film surface. This arrangement enables the embodiment to keep the magnetic head which is provided on the pressure plate in a given planar position relative to the film and also to retain its perpendicularity relative to the traveling direction of the film. Further, since the pressure plate never moves in the traveling direction of the film, the position of the magnetic head is never affected by the travel of the film. Therefore, even when the film comes to yaw during a film feeding process, the position of the magnetic head never deviates from the magnetic storage part of the film, so that photographic information can be always accurately written into or read out from the magnetic storage part.

Figure 8:
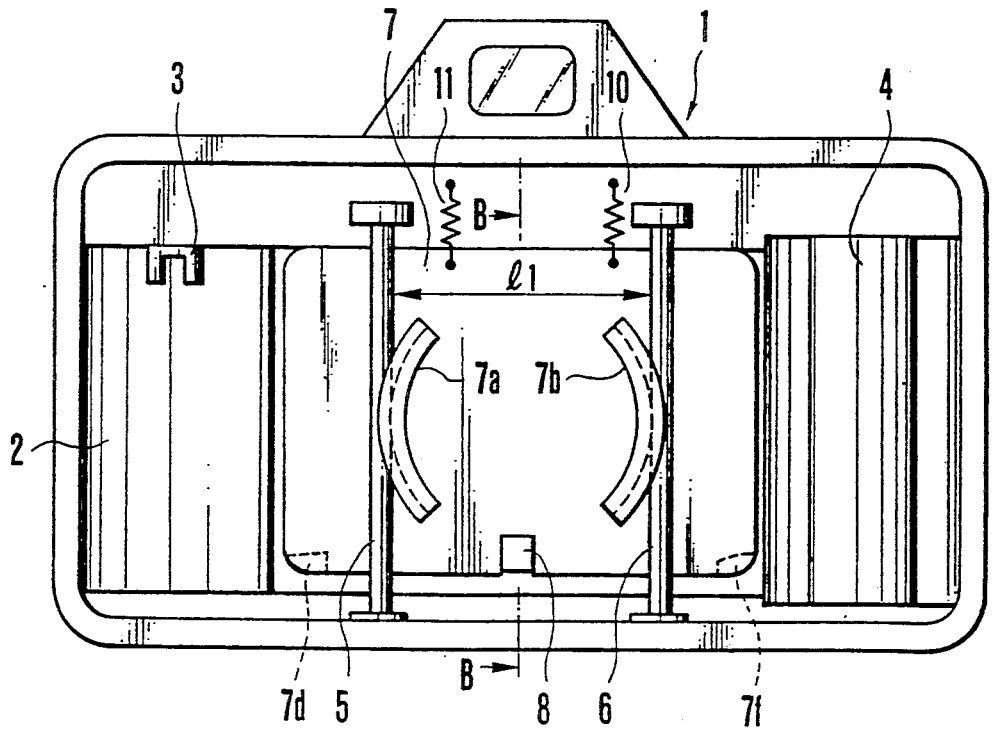
FIG. 8 is a rear elevation showing a camera arranged as a further embodiment of the invention.
Figure 9:
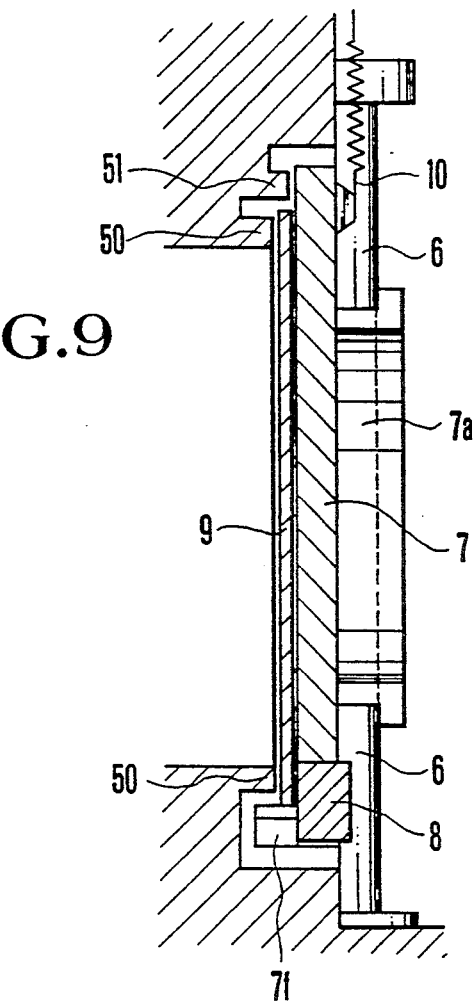
FIG. 9 is a sectional view taken on a line B—B of FIG. 8.
Figure 10:
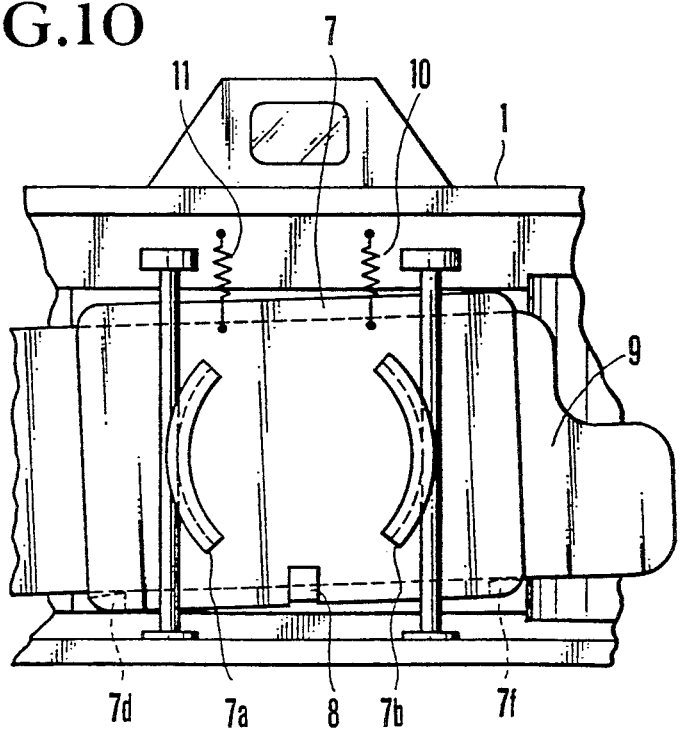
FIG. 10 is a rear elevation showing the position of the pressure plate of FIG. 8 in relation to a film.

FIGS. 8, 9 and 10 show a camera arranged as a further embodiment of the invention. FIG. 8 is a rear elevation showing the camera with the back cover thereof omitted. FIG. 9 is a sectional view taken on a line B—B of FIG. 8. FIG. 10 is a rear elevation showing the position of the pressure plate of the camera in relation to the film. Referring to FIG. 8, springs 10 and 11 are arranged on two sides of the rotation center of the pressure plate 7, one on the side of the cartridge chamber 2 and the other on the side of the film spool 4. One end of each of the springs 10 and 11 is secured to the camera body and the other end to the pressure plate 7. The pressure plate 7 is thus urged in the direction of pulling it upward. The upward urging force brings guide parts 7d and 7f which are provided on the pressure plate 7 into pressed contact with the edge of the film 9 in such a way as to keep the position of the pressure plate 7 unvarying relative to the film 9. Meanwhile, the position of the film 9 in the upward direction is restricted by an outer rail 51 as shown in FIG. 9. The guide parts 7d and 7f have tapered faces sloping to the cartridge chamber 2 respectively. This slope allows the film 9 which is pulled out of the film cartridge (not shown) to smoothly push the guide parts 7d and 7f downward against the urging force of the springs 10 and 11.

When a motor which is not shown rotates the shaft of the film cartridge through the film feeding fork 3 in the same manner as in the case of the first embodiment shown in FIG. 1, the film 9 is moved to the outside of the cartridge. The leader part of the film 9 then comes into the gap provided between the pressure plate 7 and the camera body 1. When the film 9 further moves rightward as viewed in FIG. 1, the position of the film 9 and that of the left side of the pressure plate 7 are first defined jointly by the spring 11 and the guide part 7d. When the film 9 moves still further, the position of the film 9 and the right side of the pressure plate 7 are defined jointly by the spring 10 and the guide part 7f. In the meantime, the film 9 passes by the position of the magnetic head 8. Therefore, the fore end part of the magnetic head 8 comes into sliding contact with the magnetic storage part (not shown) of the film 9 to permit photographic information to be written into or read out from the magnetic storage part. The leader part of the film 9 which is formed at the fore end of the film 9 is eventually wound around the film spool 4. After this, a film winding action can be performed solely by rotating the film spool 4 by means of a motor which is not shown.

If the film 9 comes to yaw during the film feeding process, the yaw of the film is accurately followable, because the pressure plate 7 is not only movable relative to the camera body 1 perpendicularly to the traveling direction of the film but also turnable on a plane parallel to the film surface, and the guide parts 7d and 7f of the pressure plate 7 are brought into pressed contact with the edge face of the film 9 by means of the springs 10 and 11. The magnetic head 8 is unified in one body with the pressure plate 7, and the guide parts 7d and 7f which are provided on the pressure plate 7 are brought into contact with the lower edge of the film 9 by the springs 10 and 11. Therefore, in this instance, the head gap (not shown) of the magnetic head 8 can be brought into sliding contact with the magnetic storage part of the film 9 by keeping it perpendicular to the traveling direction of the film.

Figure 11:
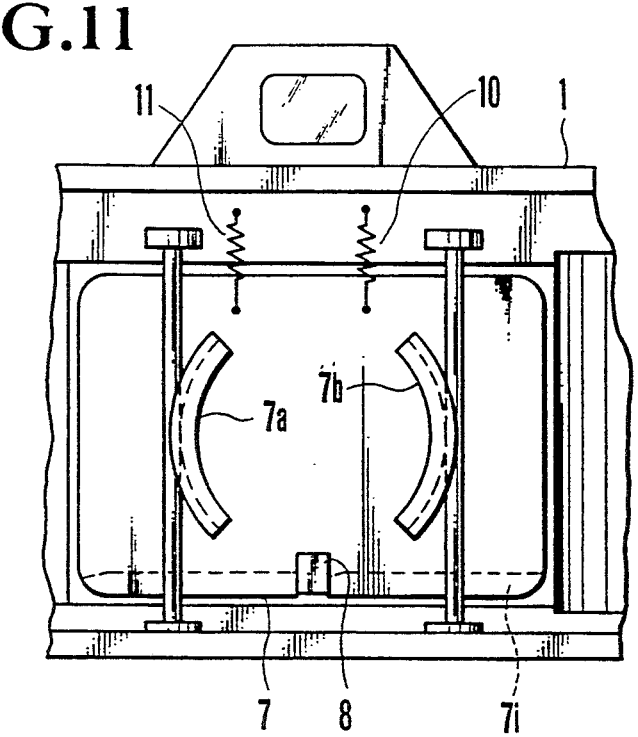
FIG. 11 is a rear elevation showing a camera arranged as a further embodiment of the invention.

FIG. 11 is a rear elevation showing a camera arranged as a further embodiment of the invention. In this case, a guide part 7i is provided at the lower end of the pressure plate 7 for coming into sliding contact with the lower edge face of the film 9. The guide part 7i is formed, for example, into a rib-like shape by drawing or stamping work on the pressure plate 7. It is also possible to form the guide part 7i by mounting a discrete member on the pressure plate 7. Further, to facilitate the insertion of the film 9, the left end part of the guide part 7i is formed into a tapered face which slopes toward the cartridge member 2. This arrangement gives the same advantageous effect as the embodiment shown in FIG. 8.

Figure 12:
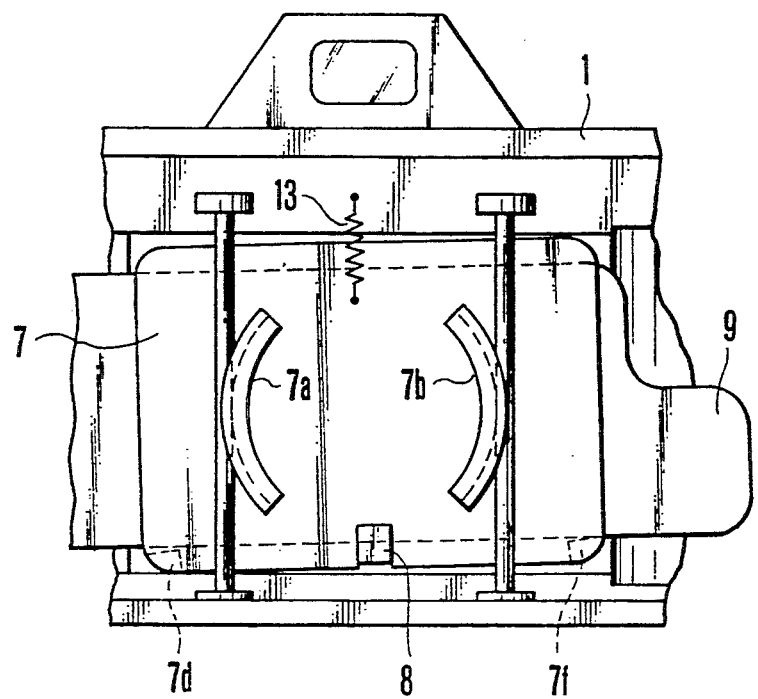
FIG. 12 is a rear elevation showing a camera arranged as a further embodiment of the invention.

FIG. 12 shows in a rear elevation a camera arranged also as an embodiment of the invention. While the embodiment shown in FIG. 8 is arranged to urge the two ends of the pressure plate 7 in the pulling up direction by means of the springs 10 and 11, the embodiment shown in FIG. 12 is arranged to apply the urging force of a single spring 13 to the center position of the pressure plate 7. This arrangement also brings the guide parts 7d and 7f into pressed contact with the edge face of the film 9 to keep the position of the pressure plate 7 unvarying in relation to the film 9. In other words, the head gap (not shown) of the magnetic head 8 which is secured to the pressure plate 7 can be brought into sliding contact with the magnetic storage part of the film 9 always in a posture perpendicular to the traveling direction of the film 9.

In the case of each of the embodiments shown in FIGS. 8 to 12, the pressure plate 7 to which the magnetic head 8 is secured is arranged not only to be movable perpendicularly to the traveling direction of the film but also to be turnable on a plane which is parallel to the film surface. In addition to that, guide parts 7d and 7f (or 7i) which are provided on the pressure plate 7 for the purpose of restricting the position of the film 9 are arranged to be brought into pressed contact with the edge face of the film by means of the elastic members, i.e., the springs 10 and 11 or the spring 13. By virtue of this arrangement, a distance from the edge face of the film to the magnetic head 8 can be kept unvarying. In addition to this, the perpendicularity of the gap of the magnetic head 8 relative to the traveling direction of the film 9 can be accurately kept at 90 degree.

Figure 13:
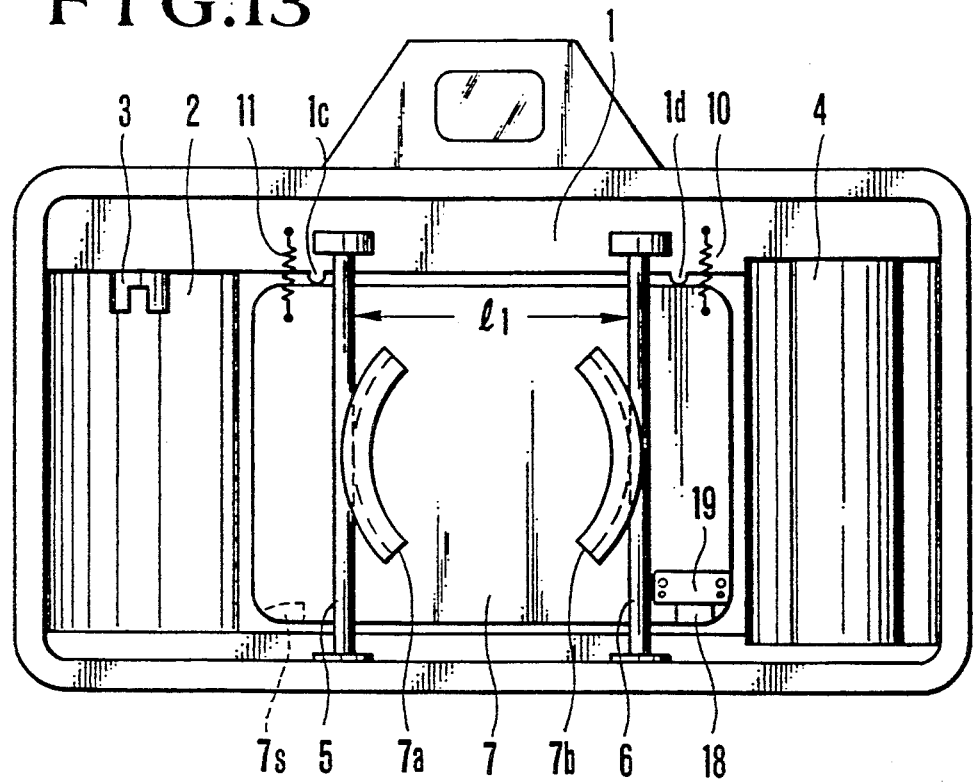
FIG. 13 is a rear elevation of a camera arranged as a further embodiment of the invention.
Figure 14:
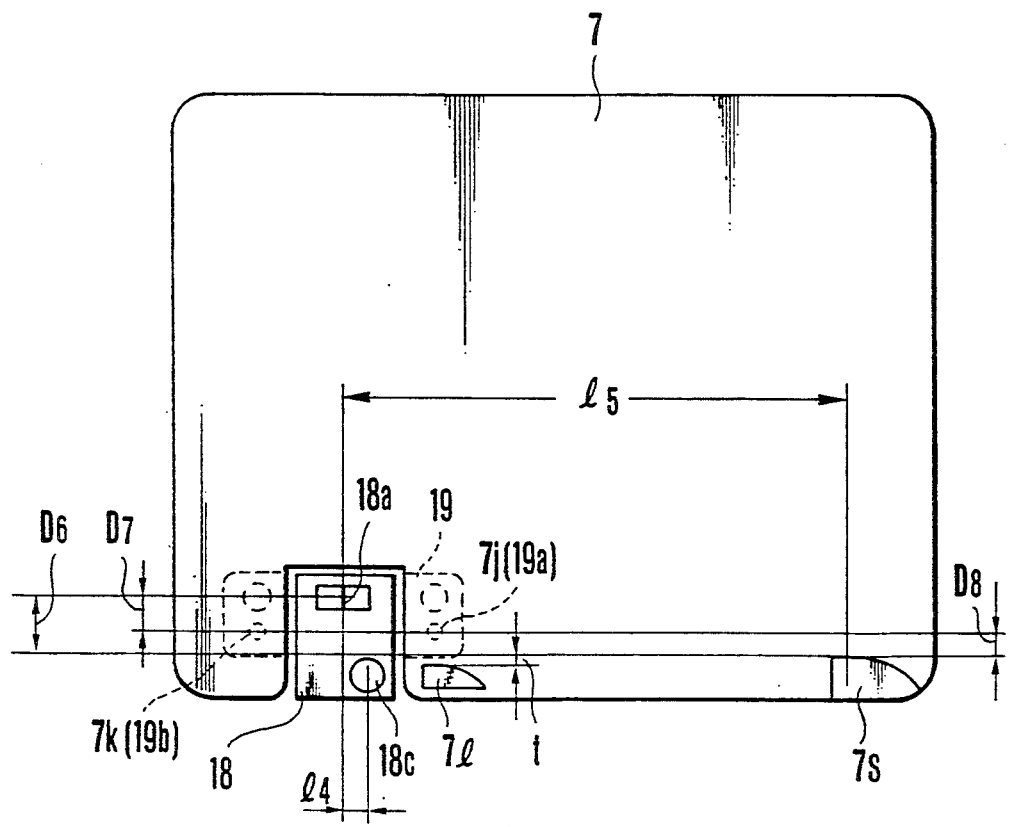
FIG. 14 is a front view showing a pressure plate and a magnetic head of the camera of FIG. 13 as viewed from the side of film.
Figure 15:
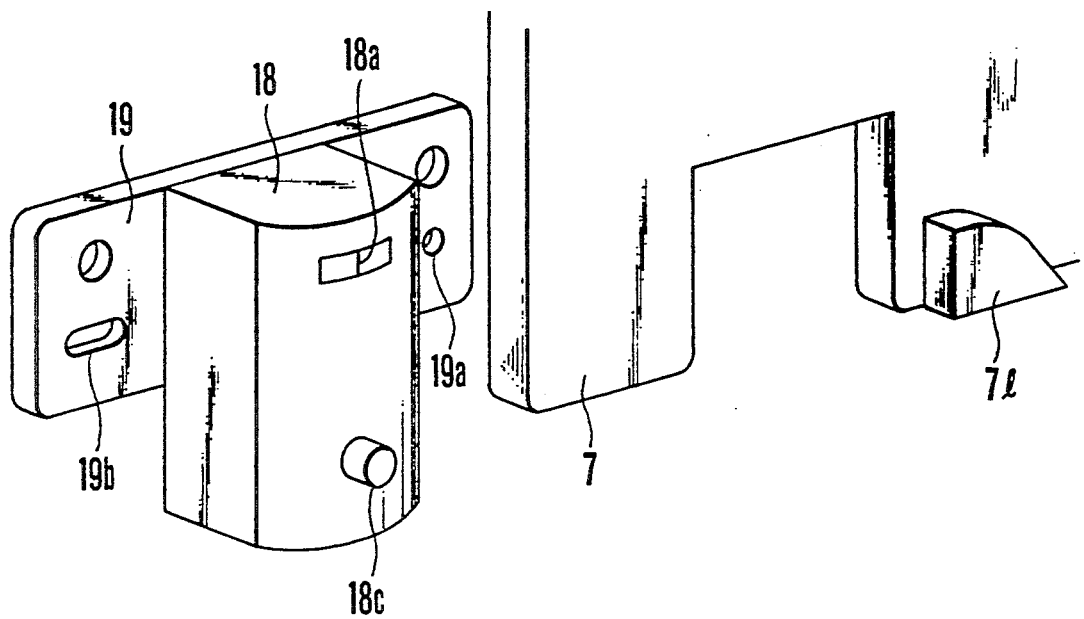
FIG. 15 is an oblique view showing the same magnetic head and the mount part of the pressure plate for mounting the magnetic head.
Figure 16:
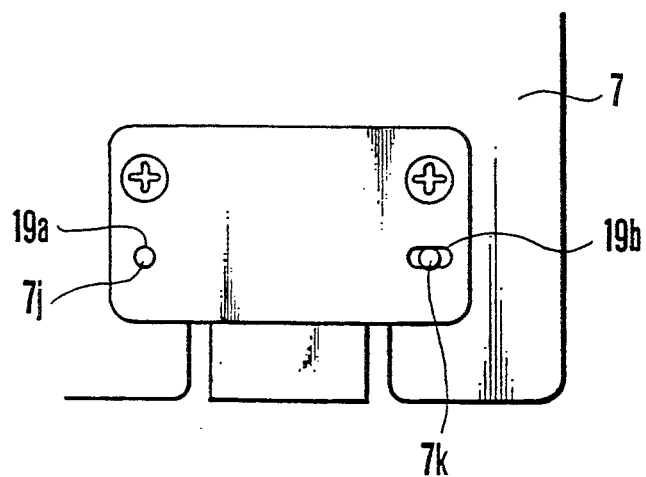
FIG. 16 is a rear view showing a camera arranged according to this invention as a further embodiment thereof.
Figure 17:
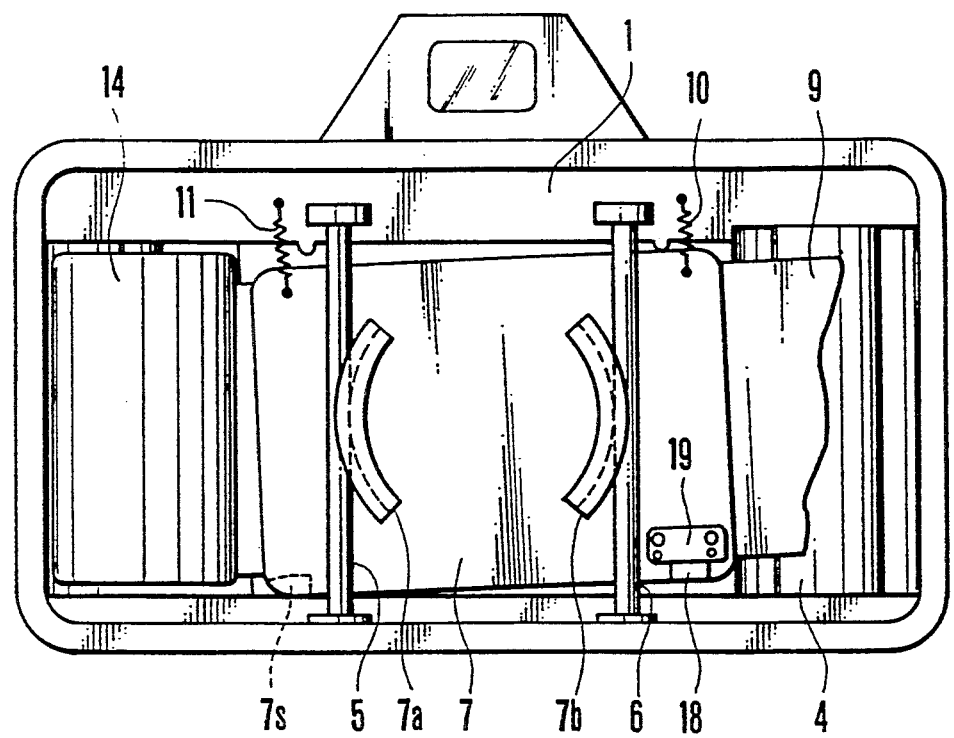
FIG. 17 is a rear elevation showing the position of a pressure plate of the same camera in relation to a film.

FIGS. 13 to 17 show a camera arranged as a further embodiment of the invention. FIG. 13 shows in a rear elevation the camera with its back cover omitted. FIG. 14 is a front view showing the pressure plate and the magnetic head as viewed from the film surface side of the camera of FIG. 13. FIG. 15 is an oblique view partly showing the camera of FIG. 13 including the magnetic head and a part of the pressure plate on which the magnetic head is mounted. FIG. 16 is a rear elevation showing a part of the camera of FIG. 13 including the magnetic head in a state of being mounted on the pressure plate. FIG. 17 is a rear elevation of the same camera showing the position of the pressure plate in relation to the film.

The pressure plate 7 is provided with a guide part 7s and a film introducing part 7l which are arranged on the side of the pressure plate 7 facing the film surface to abut on the edge face of the film 9 and which have tapered faces sloping toward the cartridge chamber 2, as shown in FIG. 14. Further, a magnetic head 18 is secured to the lower part of the pressure plate 7 through a mount plate 19 by means of a screw or the like.

The magnetic head 18 is provided with a magnetic gap 18a and a dowel 18c. The mount plate 19 is provided with positioning holes 19a and 19b for positioning the magnetic head 18 relative to the pressure plate 7 by fitting these holes on dowels 7j and 7k of the pressure plate 7, as shown in FIG. 16. In the absence of the film 9, springs 10 and 11 bring the pressure plate 7 into contact with stoppers 1c and 1d which are provided on the camera body 1, as shown in FIG. 13.

The film introducing part 7l which is provided on the pressure plate 7 is disposed in a position which is lower by a very small distance "t" than a line connecting the film abutting face of the guide part 7s to the dowel 18c of the magnetic head 18, as shown in FIG. 14.

The film 9 which is pulled out from the film cartridge 14 placed within the cartridge chamber 2 first abuts on the tapered face of the guide part 7s and then pushes the pressure plate 7 downward against the urging force of the springs 10 and 11. When the film 9 is moved further, the film comes to abut on the tapered face of the film introducing part 7l to push the pressure plate 7 downward to assist smooth insertion of the dowel 18c of the magnetic head 18 to the lower end face of the film 9. When the film 9 is fed further, the guide part 7l of the pressure plate 7 is brought into constant contact with the dowel 18c of the magnetic head 18 by the urging force of the springs 10 and 11. This keeps the position of the pressure plate 7 and that of the magnetic head 18 unvarying relative to the film 9 even if the film 9 comes to vertically yaw or slant during its travel. The film 9 has a magnetic storage part formed on one side thereof facing the pressure plate 7. The magnetic head 18 is arranged to write or read information on various matters relative to photographing into or out from the magnetic storage part during the film feeding process.

With the embodiment arranged in the above-stated manner, the film cartridge 14 is placed in the cartridge chamber 2 by opening the back cover (not shown) which is pivotally attached to one side edge part of the camera body 1. After this, when the shaft of the film cartridge 14 is rotated through the film feeding fork 3 by means of a motor (not shown) in the same manner as in the case of the embodiment shown in FIG. 1, the film 9 is pushed out of the cartridge 14. The leader part of the film 9 comes into a gap between the pressure plate 7 and the camera body 1. When the film 9 moves to the right as viewed in FIG. 13, the urging force of the springs 10 and 11 brings the guide part 7s and the dowel 18c of the magnetic head 18 into contact with the lower edge face of the film 9 as mentioned above. By this, the position of the pressure plate 7 and that of the magnetic head 18 are controlled in relation to the film 9.

During the above-stated film feeding process, the film 9 passes by the position of the magnetic head 18. The magnetic gap 18a of the magnetic head 18, therefore, comes into sliding contact with the magnetic storage part (not shown) of the film 9, so that photographic information can be written into or read out from the magnetic storage part. The leader part located at the fore end of the film 9 eventually comes to be wound around the film spool 4. After that, the film 9 is wound solely by the rotation of the spool 4 caused by a motor (not shown).

The pressure plate 7 is arranged to be movable relative to the camera body 1 perpendicularly to the traveling direction of the film and also to be turnable on a plane parallel to the film surface. Therefore, even in the event of yawing of the film 9 during the film feeding process, the yaw of the film 9 can be accurately followed. The magnetic head 18 is unified in one body with the pressure plate 7. The guide part 7s of the pressure plate 7 and the dowel 18c of the magnetic head 18 are urged to be constantly abutting on the lower edge face of the film 9 by the springs 10 and 11. Therefore, the perpendicularity of the magnetic gap 18a relative to the traveling direction of the film 9 and the planar position of it relative to the film 9 can be accurately retained.

Figure 18:
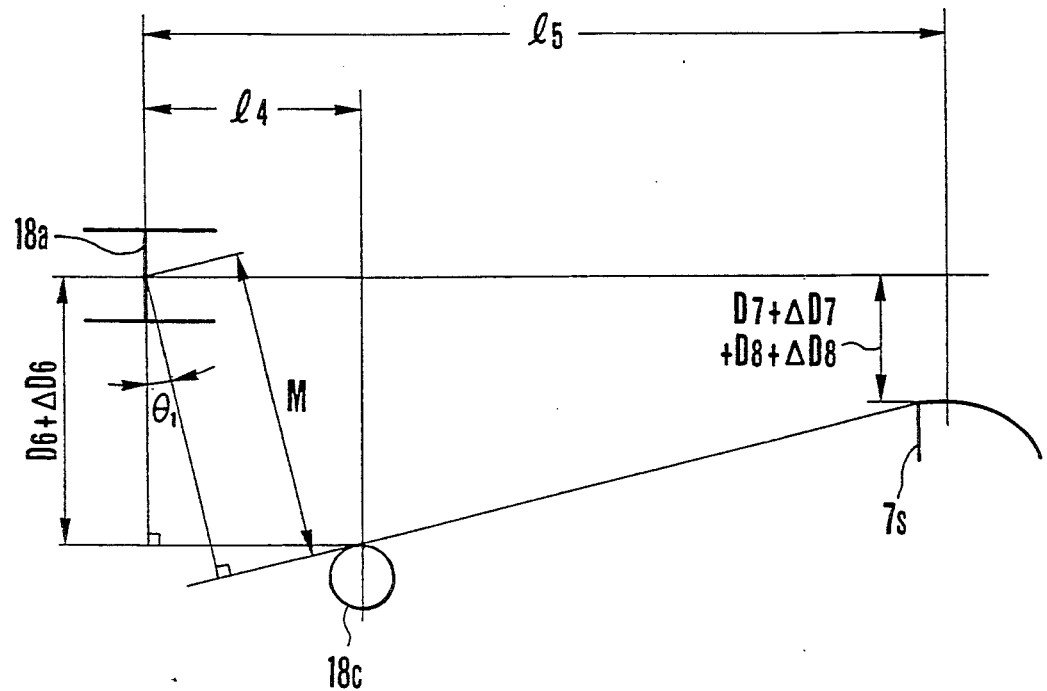
FIG. 18 shows an advantageous effect attainable by the embodiment shown in FIG. 13.

The arrangement of the embodiment which gives the above-stated advantages is described in detail with reference to FIG. 14 as follows:

In FIG. 14, a reference symbol D6 denotes a vertical distance from the magnetic gap 18a to the dowel 18c. A symbol D7 denotes a distance from the magnetic gap 18a to the positioning holes 19a and 19b. A symbol D8 denotes a vertical distance from the positioning dowels 7k and 7i to the guide part 7s. A symbol $l_4$ denotes a lateral distance from the magnetic gap 18a to the dowel 18c. A symbol $l_5$ denotes a lateral distance from the magnetic gap 18a to the guide part 7s. Assuming that the dimensional error of the above-stated distance D6 is expressed as ΔD6, that of the distance D7 as ΔD7 and that of the distance D8 as ΔD8, as shown in FIG. 18, an inclination $\theta 1$ can be expressed as follows:

$$\theta 1 = \tan^{-1} \frac{\Delta D6 - (\Delta D7 + \Delta D8)}{l_5 - l_4}$$

With the dimensional errors ΔD6, ΔD7 and ΔD8 assumed to be, for example, ±0.03 mm, the distance $l_4$ to be 3 mm and the distance $l_5$ to be 43 mm, the inclination $\theta 1$ becomes as shown below:

$$\theta 1 = 0.129° \quad (1)$$

Further, since tan $\theta 1 = 0.00225$, sin $\theta 1 = 0.00225$ and $1/\cos \theta 1 = 1.0000025$, a distance M shown in FIG. 18 becomes as shown below:

$$M = (D6 + \Delta D6) \cdot \frac{1}{\cos \theta 1} +$$

$$\{l_4 - (D6 + \Delta D6) \tan \theta 1\} \sin \theta 1 \approx D6 + \Delta D6 + l_4 \times 0.00225$$

Therefore, an error D6−M becomes as shown below:

$$\begin{aligned} D6 - M &= \Delta D6 + l_4 \times 0.00225 \quad (2)\\ &= 0.03 + 0.00675\\ &= 0.03675 \end{aligned}$$

The relative position error between the magnetic gap 18a and the magnetic storage part of the film 9 thus becomes ±0.03675 as shown by Formula (2) above. This indicates excellent accuracy. Further, if the distance $l_4$ is set at "0", the error D6−M becomes ±0.03.

In accordance with Formula (1) above, the maximum value of the inclination $\theta 1$ is ±0.129°, which indicates that the position of the magnetic gap 18a of the magnetic head 18 relative to the traveling direction of the film is kept at excellent degree of perpendicularity.

Figure 19:
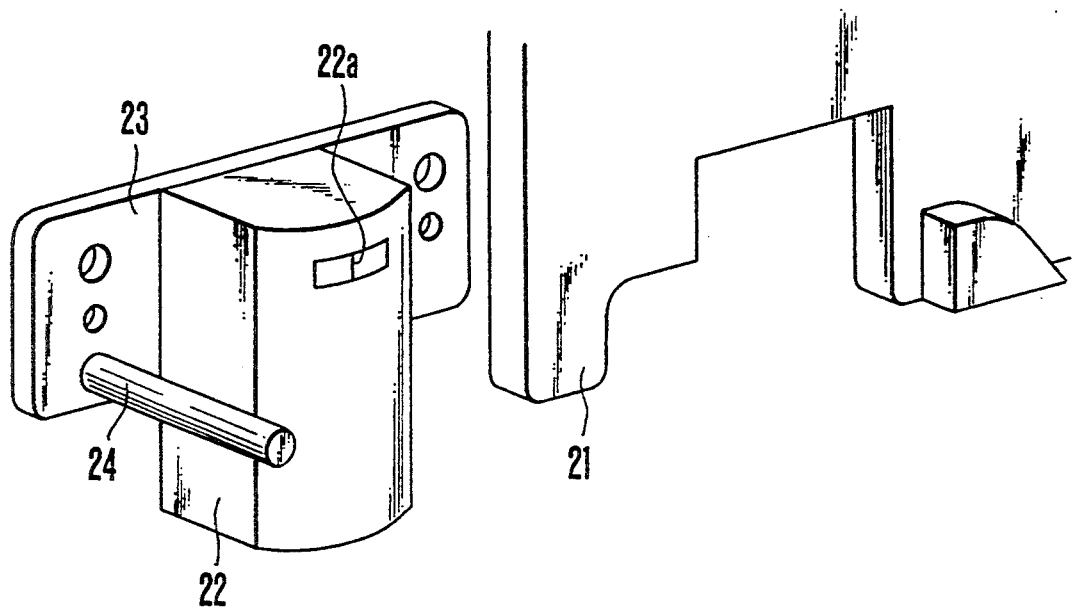
FIG. 19 is an oblique view showing a magnetic head of a further embodiment of the invention and the mount part of the pressure plate for mounting the magnetic head.
Figure 20:
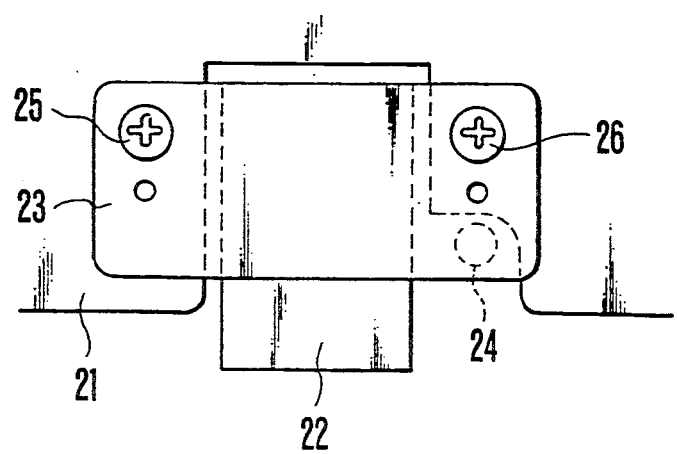
FIG. 20 is a rear view showing the same pressure plate as in a state of having a magnetic head mounted thereon.

A further embodiment of the invention is arranged as shown in FIGS. 19 and 20. FIG. 19 shows in an oblique view the magnetic head, the pressure plate, etc. of the embodiment. FIG. 20 shows in a rear elevation the magnetic head as in a state of being mounted on the pressure plate. In this case, a dowel 24 to be abutted on the lower edge face of the film is mounted on a mount plate 23 at a high degree of precision by welding or the like with the aid of a microscope or the like in a position near to the magnetic gap 22a of the magnetic head 22, i.e., leaving only a short distance between the magnetic gap 22a and the dowel 24 in the direction perpendicular to the surface of the drawing. The realization of this arrangement would give the same advantageous effect as the embodiment shown in FIG. 13. In FIGS. 19 and 20, a reference numeral 21 denotes the pressure plate; and numerals 25 and 26 mounting screws.

According to the arrangement of each of the embodiments shown in FIGS. 13 to 20, the magnetic head is secured to the pressure plate. The pressure plate is movable perpendicularly to the traveling direction of the film and is also turnable on a plane which is parallel to the film surface. Further, guide parts (ribs) which restrict the film position are provided near the pressure plate and the magnetic head or on the magnetic head mounting plate near to the magnetic gap. These guide parts are arranged to be brought into pressed contact with the edge face of the film by elastic members (springs). The distance from the edge face of the film to the magnetic head thus can be kept unvarying by this arrangement. In addition to this, the perpendicularity of the magnetic head (magnetic gap) relative to the traveling direction of the film can be accurately retained.

Figure 21:
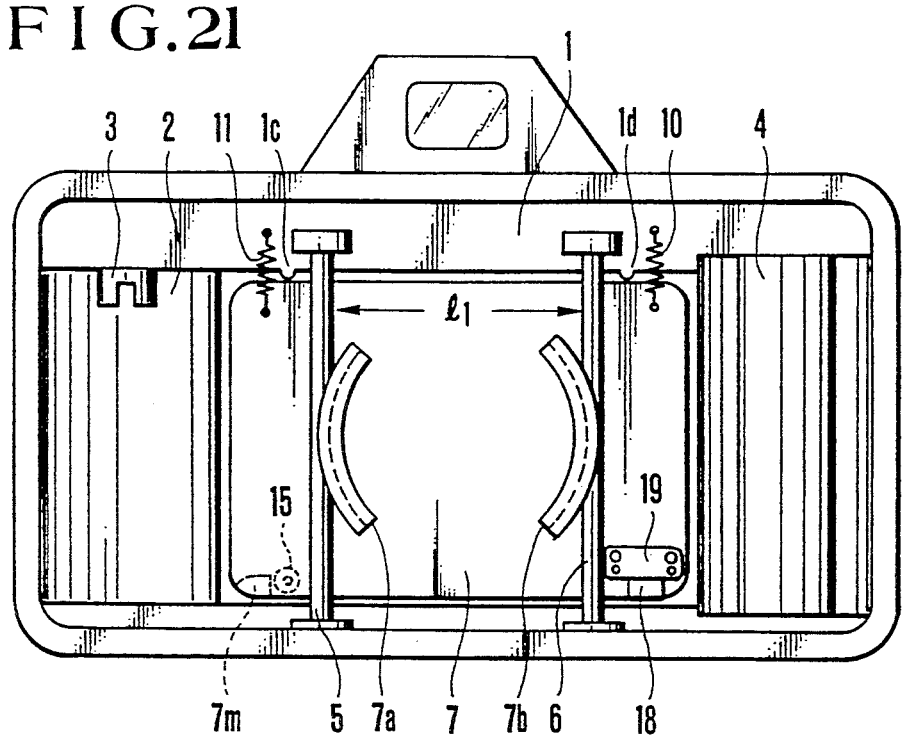
FIG. 21 is a rear elevation showing a camera arranged as a further embodiment of the invention.
Figure 22:
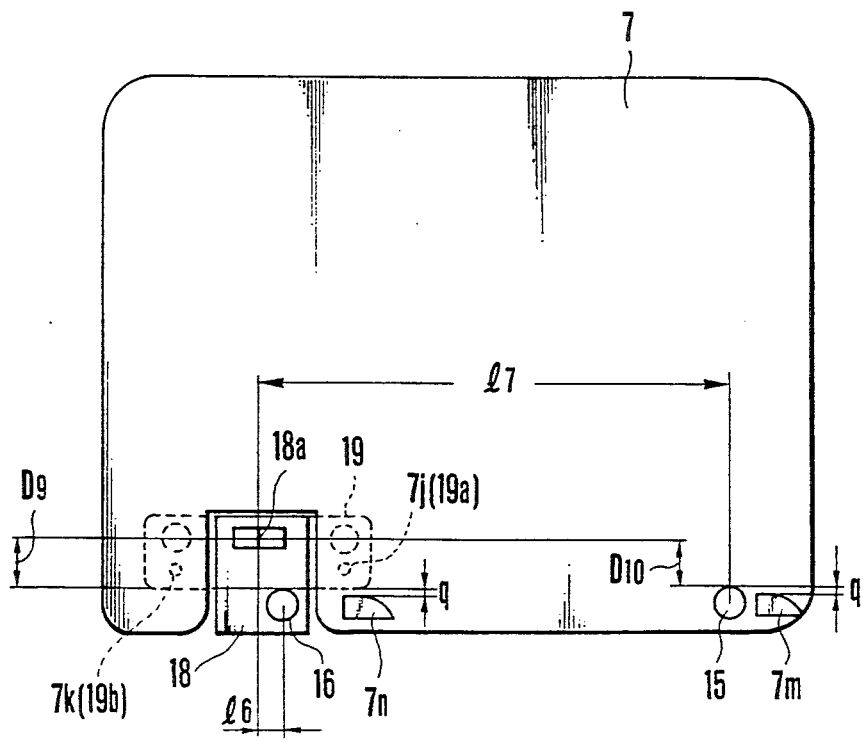
FIG. 22 is a front view showing a pressure plate and a magnetic head of the camera of FIG. 21 as viewed from on the side of film.
Figure 23:
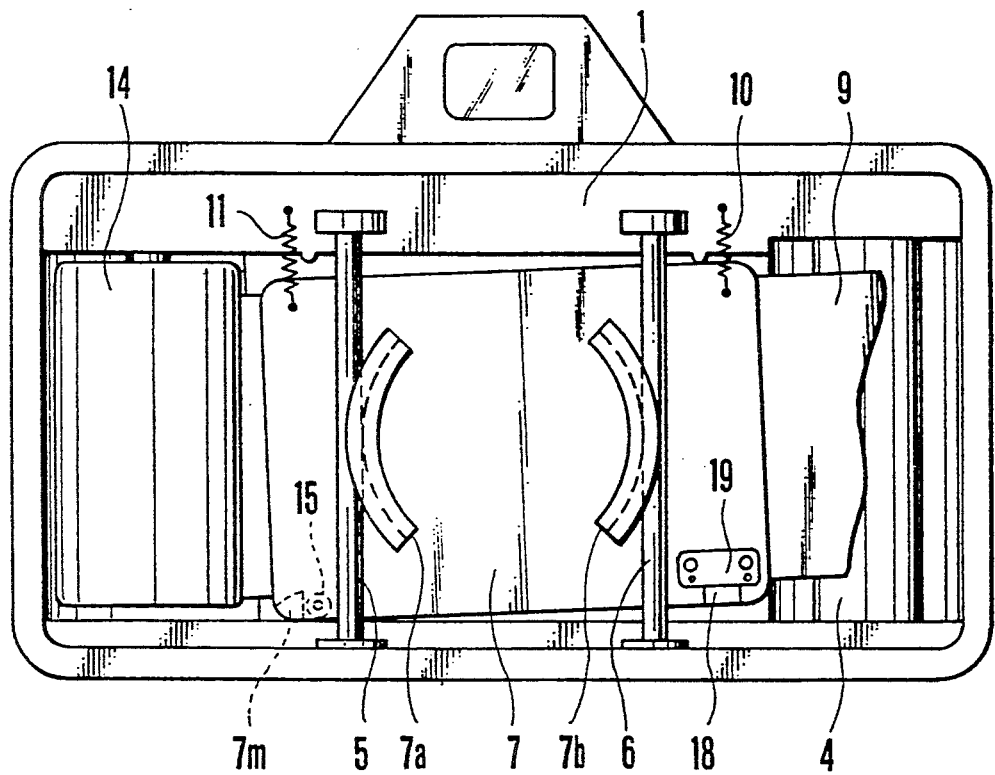
FIG. 23 is a rear elevation showing the position of the same pressure plate in relation to the film.

FIGS. 21, 22 and 23 show a camera which is arranged as a further embodiment of the invention. FIG. 21 is a rear elevation showing the camera with the back cover of it omitted. FIG. 22 is a front view showing the pressure plate and the magnetic head as viewed from the film surface side of the camera of FIG. 21. FIG. 23 is a rear elevation showing the position of the pressure plate of the camera of FIG. 22 in relation to that of the film.

Referring to these figures, a guide part 7m which is arranged to abut on the edge face of the film 9 and a film introducing part 7n are disposed on the film surface side of the pressure plate 7 with their tapered faces sloping toward the cartridge chamber 2. The magnetic head 18 is secured to the lower part of the pressure plate 7 through a mount plate 19 by means of screws or the like.

Figure 24:
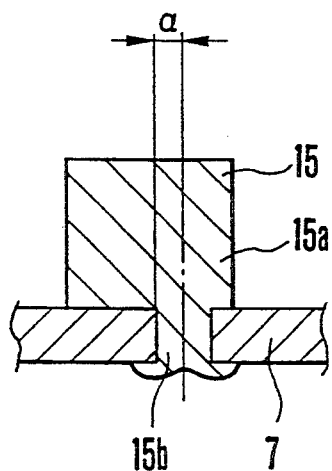
FIG. 24 is a sectional view showing a first guide member in a state being mounted on the pressure plate.

A first guide member 15 which is arranged to abut on the edge face of the film 9 is semi-fixedly attached to the pressure plate 7 at its part 15b by caulking or the like, as shown in FIG. 24. Referring to FIG. 24, the first guide member 15 includes a guide part 15a which is arranged to abut on the film. The center of the guide part 15a and that of the part 15b are arranged to be eccentric to a degree α. The arrangement is such that a distance D10 shown in FIG. 22 is finely adjustable by turning the guide member 15.

A second guide member 16 is mounted on the magnetic head 18 in a shape and a manner similar to the first guide member 15. Therefore, a distance D9 which is shown in FIG. 22 is also finely adjustable by turning the second guide member 16.

The film introducing parts 7m and 7n disposed on the pressure plate 7 are respectively provided with the tapered faces which are sloping toward the cartridge chamber 2 as mentioned above. The parts 7m and 7n are located lower than a line connecting the film abutting faces of the first and second guide members 15 and 16 by a very small distance "q", as shown in FIG. 22.

The film 9 which is pushed out from the film cartridge 14 disposed within the cartridge chamber 2 first comes to abut on the tapered face of the guide (or film introducing) part 7m. The film 9 then pushes the pressure plate 7 downward against the urging force of the springs 10 and 11 in such a way as to help the first guide member 15 smoothly come under the lower edge face of the film 9. When the film 9 is moved further, the film 9 abuts on the tapered face of the film introducing part 7n to push the pressure plate 7 downward to help the second guide member 16 smoothly come under the lower edge face of the film 9. When the film 9 is fed still further, the urging force of the springs 10 and 11 causes the lower edge face of the film 9 to be constantly abutting on the first and second guide members 15 and 16. Therefore, even if the film 9 happens to vertically yaw or to slant during its travel, the above-stated arrangement of the embodiment always keeps constant a positional relation of the pressure plate 7 and the magnetic head 18 to the film 9, as shown in FIG. 23. Further, a magnetic storage part is formed on the surface of the film 9 on its side facing the pressure plate 7. The magnetic head 18 is arranged to write or read information of varied kinds relative to photographing into and out of the magnetic storage part during film feeding.

With the embodiment arranged as described above, the photographer puts the film cartridge 14 into the cartridge chamber 2 by opening the back cover which is not shown but is pivotally attached to one side edge part of the camera body 1. After that, when the film feeding fork 3 is caused by a motor (not shown) to rotate the shaft of the film cartridge like in the case of the embodiment shown in FIG. 1, the film 9 is pushed out of the cartridge 14. The leader part of the film 9 comes into a gap between the pressure plate 7 and the camera body 1. The film 9 thus moves to the right as viewed in FIG. 21. Then, as mentioned in the foregoing, the urging force of the springs 10 and 11 brings the first and second guide members 15 and 16 into contact with the lower edge face of the film 9 to restrict the position of the pressure plate 7 and that of the magnetic head 18 relative to the film 9. During this film feeding process, the film 9 passes by the position of the magnetic head 18. The magnetic storage part (not shown) of the film 9 thus comes into sliding contact with the magnetic gap 18a of the magnetic head 18 to permit photographic information to be written into or read out from the storage part. The leader part formed at the fore end of the film 9 eventually comes to be wound around the film spool 4. After that, the film 9 is wound up solely by the rotation of the film spool 4 caused by a motor which is not shown.

Further, even when the film 9 comes to yaw during the film feeding process, the yaw of the film 9 can be accurately followed up, because the pressure plate 7 is arranged to be not only movable perpendicularly to the traveling direction of the film but also turnable on a plane which is parallel to the film surface. In this instance, since the magnetic head 18 is unified in one body with the pressure plate 7, and since the first guide member 15 provided on the pressure plate 7 and the second guide member 16 provided on the magnetic head 18 are constantly pushed into contact with the lower edge face of the film 9 by means of the springs 10 and 11, the magnetic head 18, that is, the magnetic gap 18a, can be kept in an apposite position to abut on the magnetic storage part of the film 9 always perpendicularly to the traveling direction of the film 9.

Figure 25:
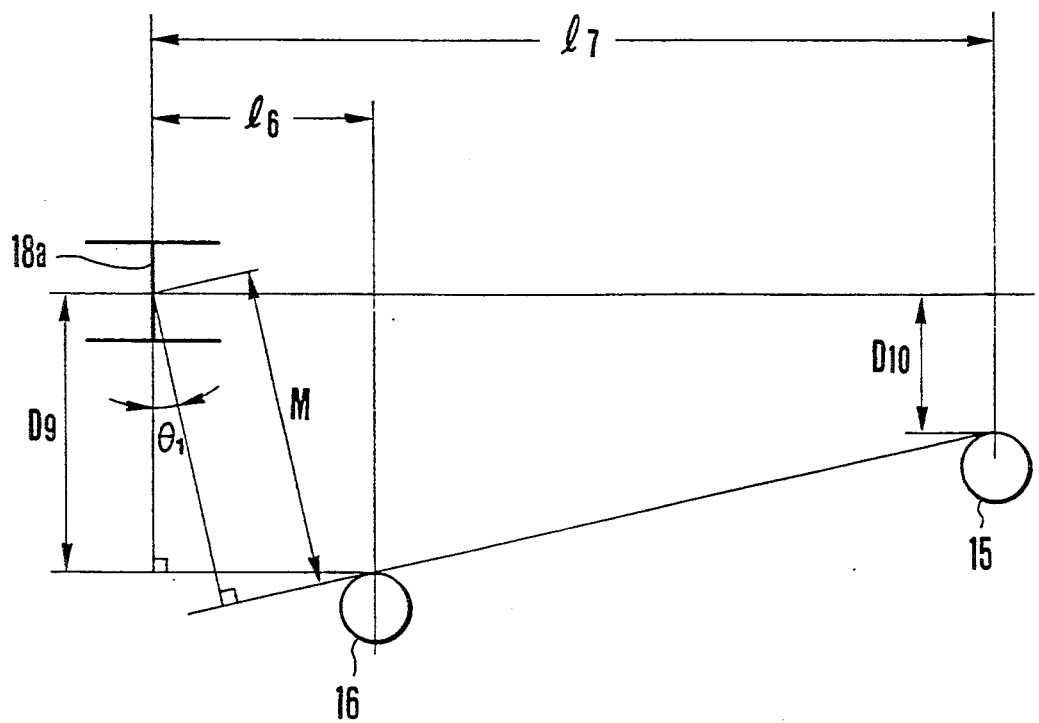
FIG. 25 shows an adjustment method employed by the camera of FIG. 21 and the advantageous effect of the method.

A method for adjusting the position of the magnetic gap 18a of the magnetic head 18 and the perpendicularity of it relative to the film 9 will be described below with reference to FIGS. 22 and 25:

In these figures, a reference symbol D9 denotes a distance in the vertical direction, as viewed in the drawings, from the magnetic gap 18a to the second guide member 16. A symbol D10 denotes a vertical distance from the magnetic gap 18a to the first guide member 15. A symbol $l_6$ denotes a lateral distance from the magnetic gap 18a to the second guide member 16. A symbol $l_7$ denotes a lateral distance from the magnetic gap 18a to the first guide member 15. Further, a symbol $\theta 1$ denotes the error of perpendicularity with respect to the traveling direction of the film. The perpendicularity error $\theta 1$ can be expressed by the following formula:

$$\theta 1 = \tan^{-1} \frac{D9 - D10}{l_7 - l_6}$$

Further, a reference symbol M denotes a distance from the magnetic gap 18a to the film edge face. The distance M can be expressed by the following formula:

$$M = D9 \frac{1}{\cos \theta 1} + (l_6 - D9 \tan \theta 1) \sin \theta 1$$

With the distance $l_6$ assumed to be of a value sufficiently smaller than the distance $l_7$ and to be, for example, 3 mm while the latter is 43 mm, both the distances D9 and D10 have some influence over the perpendicularity error $\theta 1$. As regards the distance M from the magnetic gap 18a to the film edge face, if the error $\theta 1$ is small and is, for example, 0.0716° in the event of D9−D10=0.05 mm. However, in such a case, the distance D9 has a great influence.

In view of this, the relative positions of the magnetic gap 18a and the magnetic storage part provided on the film 9 are first adjusted. The second guide member 16 is used for this adjustment. After this, the perpendicularity of the magnetic gap 18a relative to the traveling direction of the film is adjusted by means of the first guide member 15. In accordance with this method, the relative positions and the perpendicularity can be easily adjusted without causing the degree of precision of the relative positions to be affected by the adjustment of the perpendicularity. The advantage can be enhanced by setting the distance $l_6$ at "0".

Further, in cases where the perpendicularity must be adjusted while no fine adjustment of the relative positions of the magnetic gap 18a and the magnetic storage part is required, the second guide member 16 does not have to be used as am eccentric axis for adjustment. In such a case, it suffices to use only the first guide member 15 as the eccentric axis for the adjustment. It is another advantage that, in such a case, the relative positions are not affected by the perpendicularity adjustment.

In the embodiment described above, the second guide member 16 is mounted on the magnetic head 18. However, it does not have to be mounted on the magnetic head 18. The above-stated advantages are likewise attainable by mounting the second guide member 16 on any other suitable part as long as it is located near to the magnetic head 18 in the traveling direction of the film.

Figure 26:
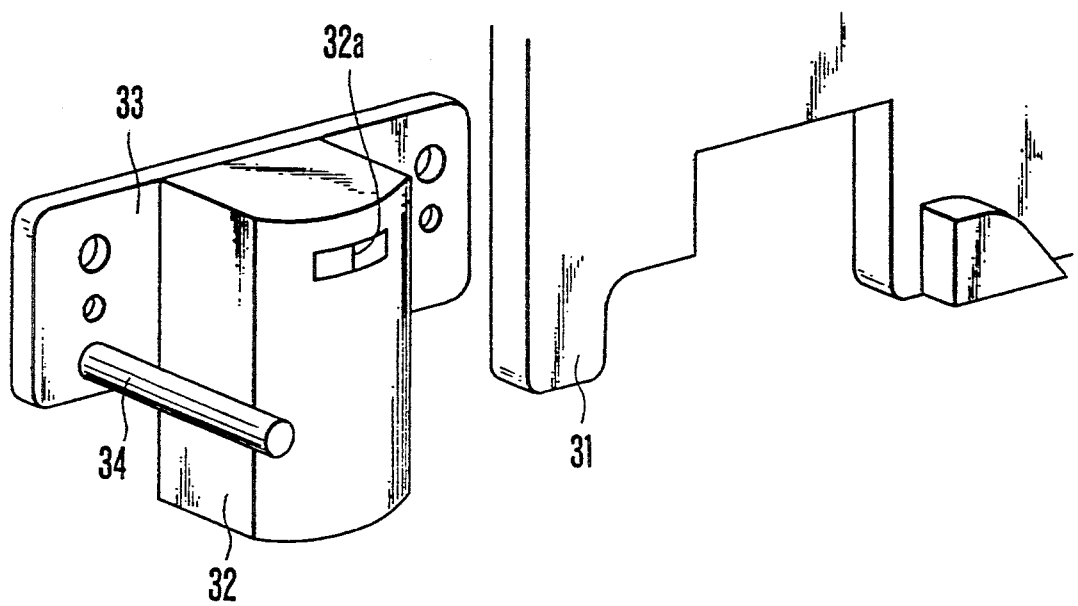
FIG. 26 is an oblique view showing a magnetic head of a further embodiment of the invention and the mount part of the pressure plate for mounting the magnetic head.
Figure 27:
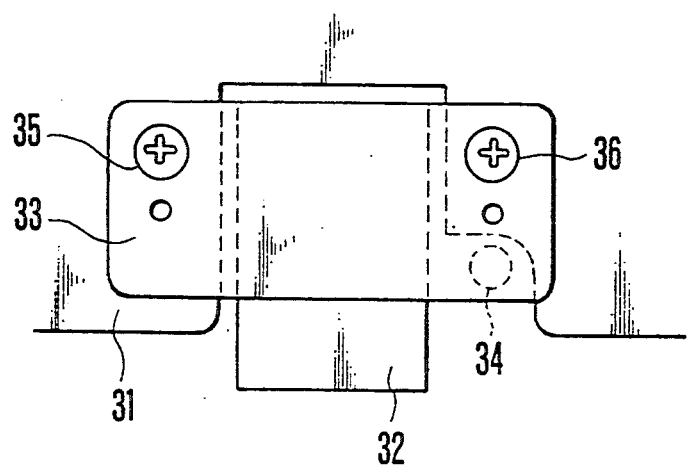
FIG. 27 is a rear view showing the same magnetic head in a state of being mounted on the pressure plate.

The eccentric adjustment axis may be provided, for example, on the mount plate or on the pressure plate 7 as shown in FIG. 26, 27, 28 or 29. The details of these changes are as described below:

FIGS. 26 and 27 show a further embodiment of the invention. FIG. 26 is an oblique view showing the magnetic head, the pressure plate, etc.. FIG. 27 is a rear elevation of the embodiment. In these figures, a reference numeral 31 denotes the pressure plate. A numeral 32 denotes the magnetic head. A numeral 33 denotes the mount plate. A numeral 34 denotes the second guide member which has the eccentric adjustment axis and is mounted on the mount plate 33. Numerals 35 and 36 denote mounting screws. In the case of this embodiment, the second guide member 34 which has the eccentric adjustment axis is mounted on the mount plate 33 for obtaining the same advantages as the embodiment shown in FIG. 21.

Figure 28:
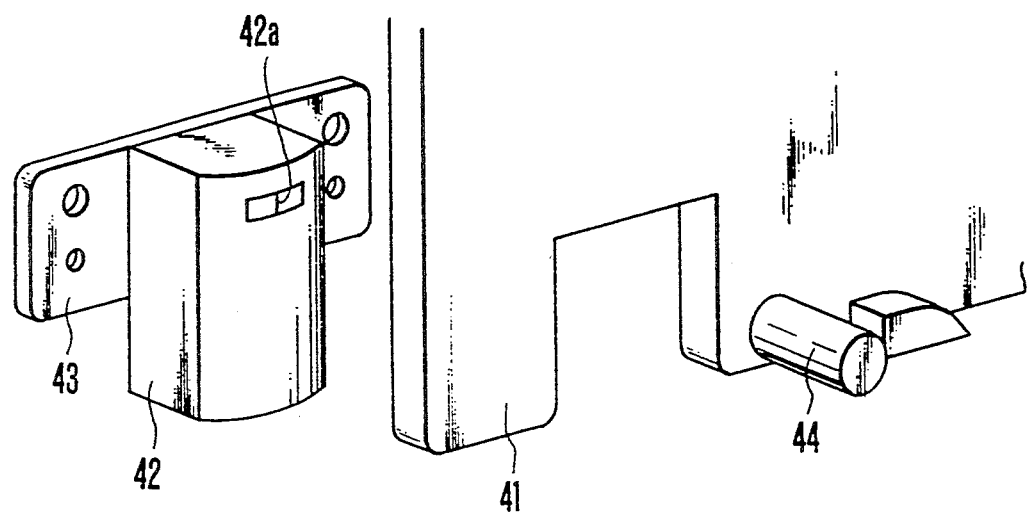
FIG. 28 is an oblique view showing a magnetic head of a further embodiment of the invention and the mount part of the pressure plate for mounting the magnetic head.
Figure 29:
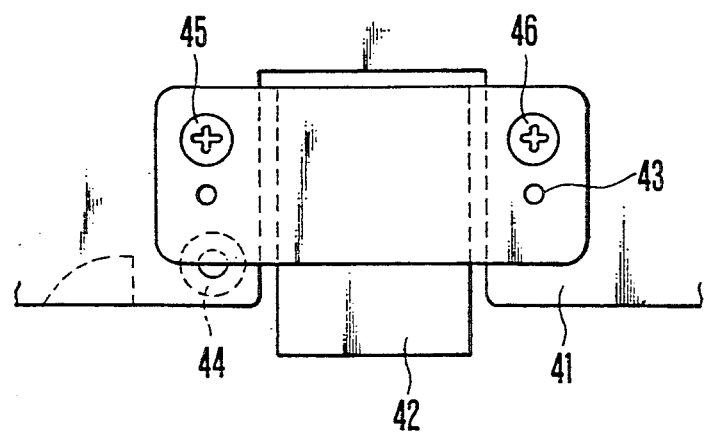
FIG. 29 is a rear view showing the same magnetic head in a state of being mounted on the pressure plate.

FIGS. 28 and 29 show a further embodiment of the invention. FIG. 28 is an oblique view showing the magnetic head, the pressure plate, etc. of the embodiment. FIG. 29 is a rear elevation showing these parts. In these figures, a reference numeral 41 denotes the pressure plate. A numeral 42 denotes the magnetic head. A numeral 43 denotes the mount plate. A numeral 44 denotes the second guide member which has the eccentric adjustment axis and is mounted on the pressure plate 41.

Numerals 45 and 46 denote mounting screws. In the case of this embodiment, the second guide member 44 which has the eccentric adjustment axis is mounted on the pressure plate 41 for obtaining the same advantageous effect as the embodiment shown in FIG. 21.

In making the pressure plate movable perpendicularly to the traveling direction of the film and turnable on a plane parallel to the film surface, each of the embodiments shown in FIGS. 21 to 29 is arranged as follows: The first guide member which is arranged to abut on one part of the film in the width direction of the film is disposed on the pressure plate. The second guide member which is arranged to abut on a guide part of the pressure plate and on the edge face of the film in the same direction is disposed on the magnetic head secured to the pressure plate (or on the mount plate or directly on the pressure plate) near to the magnetic gap in the traveling direction of the film. The first and second guide members are used as eccentric axes for adjustment in having them abut on the edge face of the film. The position of the magnetic head relative to the magnetic storage part of the film can be accurately adjusted by thus adjusting the positions of the first and second guide members. By this, the perpendicularity of the magnetic gap relative to the traveling direction of the film is accurately adjustable. The arrangement permits smooth adjustment of these members, because the position of the magnetic gap and that of the magnetic storage part relative to each other are not affected by the perpendicularity adjustment.

Further, in accordance with this invention, the arrangement for making the pressure plate slidable orthogonally relative to the traveling direction of the film and turnable on its middle part while inhibiting its movement in the film feeding direction is not limited to the embodiments described in the foregoing. The invention is of course likewise applicable to any other arrangement as long as it operates similarly to the manner described.

Figure 30:
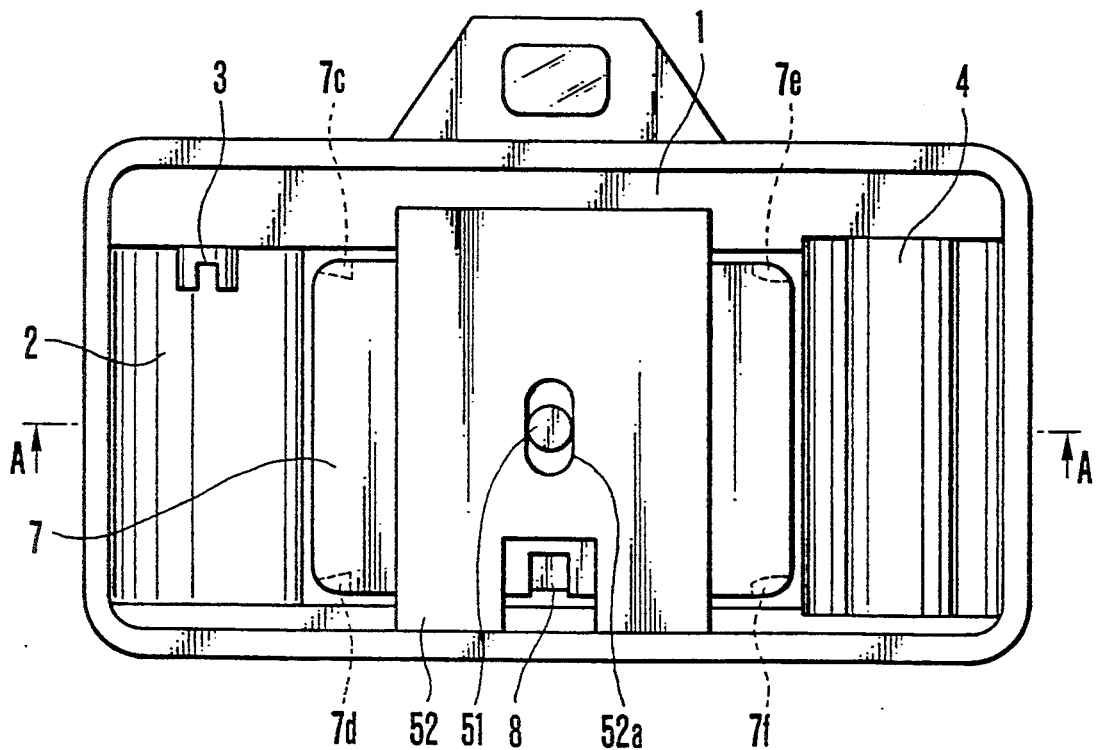
FIG. 30 is a rear elevation showing a camera arranged as a still further embodiment of the invention.
Figure 31:
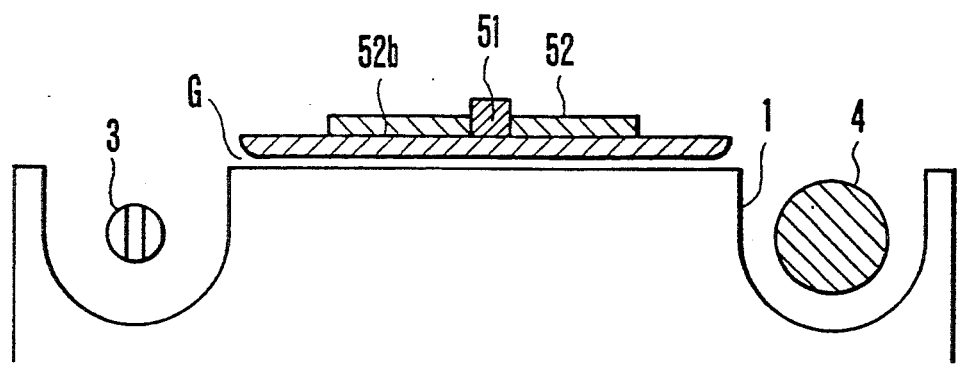
FIG. 31 is a sectional view taken on a line A—A of FIG. 30.

An example of this is as shown in FIGS. 30 and 31. FIG. 30 is a rear elevation showing the camera with its back cover omitted. FIG. 31 is a sectional view taken along a line A—A of FIG. 30. In these figures, a reference numeral 51 denotes a dowel secured to the pressure plate 7. A numeral 52 denotes a guide plate secured to the camera body 1. A numeral 52a denotes a slot provided in the guide plate 52. The dowel 51 is fitted into the slot 52a. The dowel 51, i.e., the pressure plate 7, is slidable within the slot 52a orthogonally relative to the traveling direction of the film and is also turnable on the middle part of the pressure plate 7 but is not movable in the traveling direction of the film. Further, the position of the pressure plate 7 in the direction of the optical axis is restricted by the surface 52b of the guide plate 52. The pressure plate 7 is thus arranged to be slidable orthogonally relative to the traveling direction of the film, to be turnable approximately on its middle point and to be immovable in the traveling direction of the film. This arrangement enables the magnetic head 8 to follow up the yawing movement of the film while the latter travels.

The magnetic head does not have to be secured to the pressure plate like in the case of this embodiment. The invention applies to any different arrangement of the magnetic head as long as it moves similarly to the embodiment described above.

Further, in the case of each of the embodiments described in the foregoing, the invention is applied to a camera of the kind using a film which is provided with a magnetic storage part. However, it goes without saying that the invention is likewise applicable to any camera that includes means for writing and reading information into or from the storage part of a film which is provided with a storage medium of a kind other than the magnetic storage.

What is claimed is:

1. A camera adapted to use a film which has a magnetic storage part, comprising:
   a) a magnetic, head arranged to read and/or write information out of and/or into the magnetic storage part of the film; and
   b) follow-up means arranged to cause said magnetic head to follow a yawing movement of the film caused by the travel of the film without allowing said magnetic head to follow a movement of the film in a traveling direction thereof.

2. A camera according to claim 1, wherein said follow-up means includes means for making said magnetic head displaceable perpendicularly to the traveling direction of the film.

3. A camera according to claim 2, wherein said follow-up means includes means for making said magnetic head turnable.

4. A camera according to claim 1, wherein said follow-up means includes means for making said magnetic head turnable.

5. A camera according to claim 1, wherein said follow-up means includes restricting means arranged to ensure flatness of an exposure frame of the film, and wherein said magnetic head is secured to said restricting means.

6. A camera according to claim 5, wherein said restricting means includes a pressure plate.

7. A camera according to claim 5, wherein said follow-up means includes means for making said restricting means displaceable perpendicularly to the traveling direction of the film.

8. A camera according to claim 7, wherein said follow-up means includes means for making said restricting means turnable.

9. A camera according to claim 5, wherein said follow-up means includes means for making said restricting means turnable.

10. A camera according to claim 1, wherein said follow-up means includes restricting means for determining the position of an exposure frame of the film in the direction of an optical axis, and wherein said magnetic head is secured to said restricting means.

11. A camera according to claim 10, wherein said restricting means includes a pressure plate.

12. A camera according to claim 10, wherein said follow-up means includes means for making said restricting means displaceable perpendicularly to the traveling direction of the film.

13. A camera according to claim 12, wherein said follow-up means includes means for making said restricting means turnable.

14. A camera according to claim 10, wherein said follow-up means includes means for making said restricting means turnable.

15. A camera according to claim 5, wherein said restricting means includes means for displacing said magnetic head while following a yawing movement of the film caused by the travel of the film.

16. A camera according to claim 15, wherein said restricting means includes positioning means for determining the position of the film relative to said restricting means in the direction of width of the film.

17. A camera according to claim 16, wherein said positioning means includes means for facilitating an entering movement of the film.

18. A camera according to claim 16, wherein said restricting means includes abutting means for causing the film to abut on said positioning means.

19. A camera according to claim 18, wherein said abutting means includes urging means for urging said restricting means to move in the direction of causing said positioning means to perform its positioning action.

20. A camera according to claim 19, wherein said urging means includes elastic members.

21. A camera according to claim 16, wherein said positioning means includes adjusting means for adjusting a position at which the positioning action of said positioning means is performed.

22. A camera according to claim 21, wherein said adjusting means includes a rotating member arranged to be rotatable on an eccentric axis.

23. A camera according to claim 16, further comprising second positioning means for determining the position of the film in the direction of width of the film in conjunction with said positioning means, said second positioning means being disposed on said magnetic head.

24. A camera according to claim 23, wherein said second positioning means includes second adjusting means for adjusting a position at which a positioning action of said second positioning means is performed.

25. A camera according to claim 24, wherein said second adjusting means includes a rotating member arranged to be rotatable on an eccentric axis.

26. A camera according to claim 16, further comprising second positioning means for determining the position of the film in the direction of width of the film in conjunction with said positioning means, said second positioning means being disposed in the vicinity of said magnetic head.

27. A camera according to claim 26, wherein said second positioning means includes second adjusting means for adjusting a position at which a positioning action of said second positioning means is performed.

28. A camera according to claim 27, wherein said second adjusting means includes a rotating member arranged to be rotatable on an eccentric axis.

29. A camera according to claim 16, further comprising second positioning means for determining the position of the film in the direction of width of the film in conjunction with said positioning means, said second positioning means being disposed on a mount member provided for mounting said magnetic head on said restricting means.

30. A camera according to claim 29, wherein said second positioning means includes second adjusting means for adjusting a position at which a positioning action of said second positioning means is performed.

31. A camera according to claim 30, wherein said second adjusting means includes a rotating member arranged to be rotatable on an eccentric axis.

32. A camera according to claim 21, wherein said positioning means is disposed away from said magnetic head.

33. A camera according to claim 32, further comprising second positioning means for determining the position of the film in the direction of width of the film in conjunction with said positioning means, said second positioning means being disposed on said magnetic head.

34. A camera according to claim 33, wherein said second positioning means includes second adjusting means for adjusting a position at which a positioning action of said second positioning means is performed.

35. A camera according to claim 32, further comprising second positioning means for determining the position of the film in the direction of width of the film in conjunction with said positioning means, said second positioning means being disposed in the vicinity of said magnetic head.

36. A camera according to claim 35, wherein said second positioning means includes second adjusting means for adjusting a position at which a positioning action of said second positioning means is performed.

37. A camera according to claim 32, further comprising second positioning means for determining the position of the film in the direction of width of the film in conjunction with said positioning means, said second positioning means being disposed on a mount member provided for mounting said magnetic head on said restricting means.

38. A camera according to claim 37, wherein said second positioning means includes second adjusting means for adjusting a position at which a positioning action of said second positioning means is performed.

39. A camera according to claim 10, wherein said restricting means includes means for displacing said magnetic head while following a yawing movement of the film caused by the travel of the film.

40. A camera according to claim 39, wherein said restricting means includes positioning means for determining the position of the film relative to said restricting means in the direction of width of the film.

41. A camera according to claim 40, wherein said positioning means includes means for facilitating an entering movement of the film.

42. A camera according to claim 40, wherein said restricting means includes abutting means for causing the film to abut on said positioning means.

43. A camera according to claim 42, wherein said abutting means includes urging means for urging said restricting means to move in the direction of causing said positioning means to perform its positioning action.

44. A camera according to claim 43, wherein said urging means includes elastic members.

45. A camera according to claim 40, wherein said positioning means includes adjusting means for adjusting a position at which the positioning action of said positioning means is performed.

46. A camera according to claim 45, wherein said adjusting means includes a rotating member arranged to be rotatable on an eccentric axis.

47. A camera according to claim 40, further comprising second positioning means for determining the position of the film in the direction of width of the film in conjunction with said positioning means, said second positioning means being disposed on said magnetic head.

48. A camera according to claim 47, wherein said second positioning means includes second adjusting means for adjusting a position at which a positioning action of said second positioning means is performed.

49. A camera according to claim 48, wherein said second adjusting means includes a rotating member arranged to be rotatable on an electric axis.

50. A camera according to claim 40, further comprising second positioning means for determining the position of the film in the direction of width of the film in conjunction with said positioning means, said second positioning means being disposed in the vicinity of said magnetic head.

51. A camera according to claim 50, wherein said second positioning means includes second adjusting means for adjusting a position at which a positioning action of said second positioning means is performed.

52. A camera according to claim 51, wherein said second adjusting means includes a rotating member arranged to be rotatable on an eccentric axis.

53. A camera according to claim 40, further comprising second positioning means for determining the position of the film in the direction of width of the film in conjunction with said positioning means, said second positioning means being disposed on a mount member provided for mounting said magnetic head on said restricting means.

54. A camera according to claim 53, wherein said second positioning means includes second adjusting means for adjusting a position at which a positioning action of said second positioning means is performed.

55. A camera according to claim 54, wherein said second adjusting means includes a rotating member arranged to be rotatable on an eccentric axis.

56. A camera according to claim 45, wherein said positioning means is disposed away from said magnetic head.

57. A camera according to claim 56, further comprising second positioning means for determining the position of the film in the direction of width of the film in conjunction with said positioning means, said second positioning means being disposed on said magnetic head.

58. A camera according to claim 57, wherein said second positioning means includes second adjusting means for adjusting a position at which a positioning action of said second positioning means is performed.

59. A camera according to claim 56, further comprising second positioning means for determining the position of the film in the direction of width of the film in conjunction with said positioning means, said second positioning means being disposed in the vicinity of said magnetic head.

60. A camera according to claim 59, wherein said second positioning means includes second adjusting means for adjusting a position at which a positioning action of said second positioning means is performed.

61. A camera according to claim 56, further comprising second positioning means for determining the position of the film in the direction of width of the film in conjunction with said positioning means, said second positioning means being disposed on a mount member provided for mounting said magnetic head on said restricting means.

62. A camera according to claim 61, wherein said second positioning means includes second adjusting means for adjusting a position at which a positioning action of said second positioning means is performed.

63. A camera adapted to use a film which has an information storage part, comprising:
    a) a head arranged to read and/or write information out of and/or into the information storage part of the film; and
    b) follow-up means arranged to cause said head to follow a yawing movement of the film caused by the travel of the film without allowing said head to follow a movement of the film in a traveling direction thereof.

64. A magnetic storage information transmitting device for a camera adapted to use a film which has a magnetic storage part, comprising:
    a) a magnetic head arranged to read and/or write information out of and/or into the magnetic storage part of the film; and
    b) follow-up means arranged to cause said magnetic head to follow a yawing movement of the film caused by the travel of the film without allowing said magnetic head to follow a movement of the film in a traveling direction thereof.

65. A storage information transmitting device for a camera of adapted to use a film which has an information storage part, comprising:
    a) a head arranged to read and/or write information out of and/or into information storage part of film; and
    b) follow-up means arranged to cause said head to follow a yawing movement of the film caused by the travel of the film without allowing said head to follow a movement of the film in a traveling direction thereof.

* * * * *

UNITED STATES PATENT AND TRADEMARK OFFICE
CERTIFICATE OF CORRECTION

PATENT NO. : 5,136,318
DATED : August 4, 1992
INVENTOR(S) : Chikara AOSHIMA

It is certified that error appears in the above-identified patent and that said Letters Patent is hereby corrected as shown below:

COLUMN 1:

line 52, "of" should be deleted.

COLUMN 7:

line 24, "90 degree." should read --90 degrees.--

COLUMN 12:

line 30, "am" should read --an--.

COLUMN 14:

line 11, "magnetic," should read --magnetic--.

UNITED STATES PATENT AND TRADEMARK OFFICE
CERTIFICATE OF CORRECTION

PATENT NO. : 5,136,318
DATED : August 4, 1992
INVENTOR(S) : Chikara Aoshima

It is certified that error appears in the above-indentified patent and that said Letters Patent is hereby corrected as shown below:

<u>COLUMN 18</u>:

line 38, "of" should be deleted.

Signed and Sealed this

Fifth Day of October, 1993

*Attest:*

BRUCE LEHMAN

*Attesting Officer*    Commissioner of Patents and Trademarks